US012098616B2

(12) United States Patent
Solem

(10) Patent No.: US 12,098,616 B2
(45) Date of Patent: Sep. 24, 2024

(54) HYDRAULICALLY LOCKED TOOL

(71) Applicant: Odfjell Technology Invest Ltd, Kokstad (NO)

(72) Inventor: Jonas Solem, Esbjerg (DK)

(73) Assignee: Odfjell Technology Invest Ltd., Kokstad (NO)

( * ) Notice: Subject to any disclaimer, the term of this patent is extended or adjusted under 35 U.S.C. 154(b) by 10 days.

(21) Appl. No.: 17/913,143

(22) PCT Filed: Apr. 3, 2020

(86) PCT No.: PCT/EP2020/059639

§ 371 (c)(1),
(2) Date: Sep. 20, 2022

(87) PCT Pub. No.: WO2021/197625

PCT Pub. Date: Oct. 7, 2021

(65) Prior Publication Data

US 2023/0144785 A1 May 11, 2023

(51) Int. Cl.
*E21B 34/14* (2006.01)
*F15B 1/26* (2006.01)

(52) U.S. Cl.
CPC ................ *E21B 34/14* (2013.01); *F15B 1/26* (2013.01); *E21B 2200/06* (2020.05)

(58) Field of Classification Search
CPC ......... E21B 34/14; E21B 2200/06; F15B 1/26
See application file for complete search history.

(56) References Cited

U.S. PATENT DOCUMENTS 2,857,141 A 4/1957 Carpenter
2,811,210 A 10/1957 Guillot
3,737,845 A 6/1973 Maroney et al.
(Continued)

FOREIGN PATENT DOCUMENTS

AU 2017261539 A1 12/2017
CN 2521386 Y 11/2002
(Continued)

OTHER PUBLICATIONS

International Search Report, PCT/EP2022/076725, EPO (Dec. 6, 2022).

(Continued)

*Primary Examiner* — Shane Bomar
(74) *Attorney, Agent, or Firm* — Wright IP & International Law; Eric G. Wright

(57) ABSTRACT

Disclosed is a downhole tool and method of use. The tool has a sleeve assembly slideable within the tool body under the action of a hydraulic pressure differential. The sleeve assembly has a control collar portion and a first hydraulic reservoir is defined between a first end of the control collar portion and the body, and a second hydraulic reservoir is defined between a second end of the control collar portion and the body. A bleed conduit extending between the first and second hydraulic reservoirs and an electromechanical control valve across the bleed conduit is used to regulate fluid flow along the bleed conduit. The electromechanical control valve may communicate with sensors, by which control systems are transmitted to the control valve.

21 Claims, 5 Drawing Sheets

(56) References Cited

U.S. PATENT DOCUMENTS

| | | | |
|---|---|---|---|
| 4,406,335 A | 9/1983 | Koot | |
| 4,421,182 A | 12/1983 | Moody et al. | |
| 4,452,307 A | 6/1984 | Horton | |
| 4,483,394 A | 11/1984 | Peppers et al. | |
| 4,809,779 A | 3/1989 | Ledyashov et al. | |
| 4,842,062 A * | 6/1989 | Schneider | E21B 34/14 166/317 |
| 5,730,222 A | 3/1998 | Rike, Jr. | |
| 5,819,353 A | 10/1998 | Armell et al. | |
| 5,901,796 A | 5/1999 | McDonald | |
| 6,152,221 A | 11/2000 | Carmichael et al. | |
| 6,182,754 B1 | 2/2001 | Vermeeren | |
| 6,401,813 B1 | 6/2002 | Carmichael et al. | |
| 6,520,255 B2 * | 2/2003 | Tolman | E21B 43/117 166/177.5 |
| 6,543,532 B2 | 4/2003 | Estep et al. | |
| 7,055,605 B2 | 6/2006 | Howlett et al. | |
| 7,322,419 B2 | 1/2008 | Carmichael | |
| 7,347,288 B2 | 3/2008 | Lee | |
| 7,348,893 B2 | 3/2008 | Huang et al. | |
| 7,735,581 B2 | 6/2010 | Beylotte et al. | |
| 7,766,086 B2 | 8/2010 | Mondelli et al. | |
| 7,934,559 B2 | 5/2011 | Posevina et al. | |
| 8,356,671 B2 | 1/2013 | Guillory et al. | |
| 8,657,018 B2 | 2/2014 | Cravatte | |
| 8,789,579 B2 | 7/2014 | Ollerenshaw et al. | |
| 9,382,769 B2 | 7/2016 | Wilson et al. | |
| 9,453,381 B2 | 9/2016 | Moyes | |
| 9,631,432 B2 | 4/2017 | Downton | |
| 9,951,612 B2 | 4/2018 | Brown-Kerr et al. | |
| 10,041,335 B2 | 8/2018 | Purkis | |
| 10,227,826 B2 | 3/2019 | Odell, II et al. | |
| 10,352,155 B2 | 7/2019 | Wilson et al. | |
| 10,526,871 B2 | 1/2020 | Tzallas et al. | |
| 10,989,024 B2 | 4/2021 | Fripp et al. | |
| 2001/0022223 A1 | 9/2001 | Howlett | |
| 2002/0104649 A1 | 8/2002 | Allen | |
| 2005/0056429 A1 | 3/2005 | Du et al. | |
| 2005/0133220 A1 | 6/2005 | Bishop | |
| 2005/0241856 A1 | 11/2005 | Lassoie et al. | |
| 2006/0225920 A1 | 10/2006 | Treviranus et al. | |
| 2007/0095573 A1 | 5/2007 | Telfer | |
| 2008/0007423 A1 | 1/2008 | Krueger et al. | |
| 2009/0025927 A1 | 1/2009 | Telfer | |
| 2009/0169319 A1 | 7/2009 | Hart | |
| 2009/0218092 A1 | 9/2009 | Booth | |
| 2010/0089583 A1 | 4/2010 | Xu et al. | |
| 2010/0243257 A1 | 9/2010 | Krieg et al. | |
| 2011/0186355 A1 | 8/2011 | Telfer | |
| 2011/0214873 A1 | 9/2011 | Krieg et al. | |
| 2011/0278017 A1 | 11/2011 | Themig et al. | |
| 2011/0284233 A1 | 11/2011 | Wu et al. | |
| 2012/0048619 A1 | 3/2012 | Seutter et al. | |
| 2013/0192818 A1 | 8/2013 | Winn et al. | |
| 2013/0205523 A1 | 8/2013 | Palmer | |
| 2013/0248249 A1 | 9/2013 | Xu | |
| 2013/0319767 A1 | 12/2013 | Wilson et al. | |
| 2014/0116712 A1 | 5/2014 | Bansal et al. | |
| 2015/0027713 A1 | 1/2015 | Penisson | |
| 2015/0027780 A1 | 1/2015 | Hern et al. | |
| 2015/0041148 A1 * | 2/2015 | Greenan | E21B 34/103 166/374 |
| 2015/0068763 A1 | 3/2015 | Jepp et al. | |
| 2015/0114665 A1 | 4/2015 | Hora et al. | |
| 2017/0016292 A1 | 1/2017 | Solem | |
| 2019/0136674 A1 | 5/2019 | Fripp et al. | |
| 2019/0169945 A1 | 6/2019 | Orban et al. | |
| 2020/0024917 A1 * | 1/2020 | Angman | E21B 34/14 |
| 2020/0024929 A1 * | 1/2020 | Arabskyy | E21B 34/14 |
| 2020/0248531 A1 * | 8/2020 | Walton | E21B 33/12 |
| 2021/0164344 A1 | 6/2021 | Wilson et al. | |
| 2022/0243556 A1 * | 8/2022 | Boyle | E21B 23/006 |
| 2023/0167698 A1 * | 6/2023 | Hern | E21B 34/14 166/179 |
| 2023/0250706 A1 * | 8/2023 | Mair | E21B 43/38 166/373 |
| 2023/0358114 A1 * | 11/2023 | Dyck | E21B 34/14 |

FOREIGN PATENT DOCUMENTS

| | | | |
|---|---|---|---|
| CN | 204571937 | U | 8/2015 |
| CN | 205591887 | U | 9/2016 |
| CN | 205823237 | U | 12/2016 |
| EP | 0787888 | B1 | 3/2005 |
| EP | 1177366 | B1 | 3/2005 |
| EP | 2279327 | B1 | 10/2013 |
| GB | 2336612 | A | 10/1999 |
| GB | 2411919 | A | 9/2005 |
| GB | 2411920 | A | 9/2005 |
| GB | 2544136 | A | 5/2017 |
| WO | 9954590 | A1 | 10/1999 |
| WO | 0107752 | A1 | 2/2001 |
| WO | 0235055 | A1 | 5/2002 |
| WO | 03087526 | A1 | 10/2003 |
| WO | 2004022907 | A1 | 3/2004 |
| WO | 2004067908 | A1 | 8/2004 |
| WO | 2004088091 | A1 | 10/2004 |
| WO | 2006016102 | A1 | 2/2006 |
| WO | 2007003894 | A2 | 1/2007 |
| WO | 2007060449 | A2 | 5/2007 |
| WO | 2009151786 | A2 | 12/2009 |
| WO | 2010015861 | A2 | 2/2010 |
| WO | 2010048167 | A2 | 4/2010 |
| WO | 2012100259 | A2 | 7/2012 |
| WO | 2013131194 | A1 | 9/2013 |
| WO | 2014186415 | A9 | 11/2014 |
| WO | 2015150212 | A2 | 10/2015 |
| WO | 2018122543 | A1 | 7/2018 |
| WO | 2018145215 | A1 | 8/2018 |
| WO | 2019155074 | A1 | 8/2019 |

OTHER PUBLICATIONS

Patents Act 1977: Search Report Under Section 17, GB2114212.0, IPO (Jun. 25, 2022).

Patents Act 1977: Combined Search And Examination Report Under Sections 17 And 18(3), GB2112082.9, IPO (Apr. 27, 2022).

International Search Report, PCT/EP2020/059639, EPO (Nov. 9, 2020).

International Search Report, PCT/EP2019/053345, EPO (Jul. 1, 2019).

Patents Act 1977: Search Report Under Section 17, GB1802223.6, IPO (Jun. 22, 2018).

International Search Report, PCT/EP2015/056540, EPO (Jan. 15, 2016).

Patents Act 1977: Search Report Under Section 17(5), GB1509015.2, IPO (Sep. 8, 2015).

Patents Act 1977: Search Report Under Section 17(5), GB1405967.9, IPO (Sep. 23, 2014).

Schlumberger Limited. "Well Commander Ball-Activated Drilling Circulating Valve.", Feb. 23, 2024, https:// www.slb.com/products-and-services/innovating-in-oil-and-gas/completions/fluids-and-tools/wellbore-cleaning-tools/circulating-tools/well-commander-ball-activated-drilling-circulating-valve#related-information.

International Search Report, PCT/EP2022/073464, EPO (Jan. 26, 2023).

* cited by examiner

HYDRAULICALLY LOCKED TOOL

FIELD OF THE INVENTION

The invention relates to a downhole tool having an actuation mechanism with a hydraulically moveable member that is selectively lockable.

INCORPORATION BY REFERENCE

This US National Stage Entry incorporates by reference in its entirety copending PCT Application No. PCT/EP2020/059639 titled "Hydraulically Locked Tool" [sic], Hydraulically Locked Tool, filed Apr. 3, 2020.

BACKGROUND OF THE INVENTION

In the oil and gas industry drilling operations provide drilled wells to hydrocarbon reserves.

Drilling, completion, maintenance and extraction operations associated with such wells require the use of a wide variety of equipment run into the well on a work string. Such equipment frequently includes mechanical tools which must be controlled remotely from the surface, for example to switch the apparatus between one or more states.

Many such operations require fluid circulation to a particular part of the well, such as drilling fluid, steam or chemical treatments. Fluids are normally pumped through the work string.

Control over some tools can be effected using fluid in the work string, by dropping objects such as a ball or a dart into the work string to selectively block the bore of a tool and apply a back pressure to actuate a mechanism. For example, a ball may land on a seat and pressure may displace the seat and an associated sleeve downhole or re-direct fluid, to actuate a mechanism operatively coupled to the sleeve. Many tools utilise this general means of actuation, including for example circulation tools with circulation ports openable by moving a sleeve; or underreamers or cleaning/scraping tools having reaming or cleaning members which are actuated by moving a sleeve.

A problem with tools operable by selectively blocking a bore through the drill string is that the bore is then unavailable for other operations. This can be addressed by blowing the ball or dart through the hole, but since a typical well can only tolerate a limited number of such objects, this in turn normally requires the ball or dart to be caught and retrieved, or drilled through.

A further problem is that is it desirable to run in multiple tools on a single work string, to minimise the number of trips. Where several tools share generally the same principle of actuation, this may limit the number of tools that may be run in together, adding to overall time and cost of downhole operations.

US2010/089583 describes an under-reaming tool in which a central piston is hydraulically displaced to deploy the tool's milling arms. A chamber is defined between the piston and the tool body, which is divided into upper and lower parts by a wiper seal. As the piston is displaced, fluid bleeds between the upper and lower parts of the chamber via a passage, to accommodate their changing volume. A solenoid valve in the passage is actuated to open the passage and permit the piston to move. This arrangement takes up a significant radial thickness of the tool, however.

There remains a need for a means to actuate or control a downhole tool that addresses or mitigates one or more of these issues.

SUMMARY OF THE INVENTION

According to a first aspect of the invention there is provided a downhole tool, comprising:

- a body having a through bore;
- a sleeve assembly slideable within the body between a first position and a second position, under the action of hydraulic pressure and/or a biasing arrangement;
- and the body comprising a control collar portion disposed around the sleeve assembly;
- wherein a first hydraulic reservoir is defined between the sleeve assembly and the body above a first end of the control collar portion and the body, and a second hydraulic reservoir is defined between the sleeve assembly and the body below a second end of the control collar portion and the body;
- wherein the control collar portion further comprises;
  - a bleed conduit extending generally longitudinally between the first and second hydraulic reservoirs; and
  - an electromechanical control valve across the bleed conduit configured to regulate fluid flow along the bleed conduit.

The first hydraulic reservoir, bleed conduit and control valve, and the second hydraulic reservoir are longitudinally spaced apart along the tool. When the control valve is open, liquid in the reservoirs is able to pass through the bleed conduit between the first and second hydraulic reservoirs, to allow the sleeve assembly to move between the first and second positions under the action of hydraulic pressure and/or resilient biasing. When the control valve is closed, liquid is not able to pass between the first and second reservoirs and their volume is prevented from changing. Opening and closing of the control valve can thereby be used to regulate movement of the sleeve assembly. In addition, the control valve can be closed so as to hydraulically lock the sleeve in position. Furthermore, the longitudinal arrangement of the control collar portion, in particular the bleed conduit and control valve, and the hydraulic reservoirs, is radially compact.

Reference herein to the bleed conduit extending longitudinally between the first and second hydraulic reservoirs is distinct from prior art arrangements in which a conduit is located radially outside of any such cylinders or reservoirs. That is to say, that the first and second hydraulic reservoirs may have inner and outer radial dimensions around the longitudinal axis of the tool, wherein the bleed conduit does not pass radially inside of the inner dimension or outside of the outer dimension along any part of its length.

The control collar portion may comprise the entire of the bleed conduit.

The first hydraulic reservoir may be defined between a first end of the control collar portion and the body. The second hydraulic reservoir may be defined between a second end of the control collar portion and the body.

The first and second hydraulic reservoirs may be defined in part by adjacent surfaces of the sleeve assembly.

The tool may comprise one or more sensors, configured to detect a signal or series of signals. The electromechanical control valve may communicate with one or more said sensors and be operable to open and/or close on detection of a pre-determined control signal or signals detected by said sensor or sensors.

The tool may comprise any suitable sensor or combination of sensors. The tool may comprise one or more sensors configured to detect a down hole condition, such as pressure, flow rate, temperature, etc. The tool may comprise a pressure sensor, flow sensor, accelerometer, acoustic sensor or the like.

Accordingly, where the tool comprise a pressure and/or flow sensor, control over the electromechanical control valve may be affected from the surface by pumping, to increase hydrostatic pressure in the bore and/or to create fluid flow in the bore and/or outside of the tool. Where the tool comprises an accelerometer, control over the electromechanical control valve may be affected by moving the tool longitudinally or rotationally; in use by stroking or rotating the work string to which the tool is connected.

In some embodiments the electromechanical control valve is connected or connectable to a wireline, and control signals may be transmitted via the wireline, in use.

The tool may further comprise a control system configured to open and close the control valve. The control system may communicate with the electromechanical control valve and said one or more sensors or wireline, as the case may be.

It will be understood that the electromechanical control valve, or the control system in particular, may be configured to respond to a combination of such control signals and/or a combination of signals from more than one sensor, to assist in eliminating any unwanted actuation of the electromechanical control valve.

In some embodiments, for example, the tool comprises an accelerometer configured to detect rotational signals, and the control system is configured to actuate the valve responsive to a series of two or more periods of rotation and/or counter rotation separated by predetermined time intervals.

The processing resource or logic control required for the control system to effect such control over the electromechanical control valve will be well known to one skilled in the art.

The sleeve assembly may be resiliently biased towards one or other of the first and second positions, by a resilient biasing member (or members) acting between the sleeve assembly and the body. For example a spring or other suitable resilient biasing member or members may be disposed in the first and/or second hydraulic chamber. Resilient biasing may be between opposed lips or shelves (for example an annular lip) within the first and/or second reservoir, or any other suitable formation, as known in the art. One or more resilient biasing members may be provided to act between the body and the sleeve assemble elsewhere within the tool, other than in the said hydraulic reservoirs.

The sleeve assembly may be slidable under the action of a hydrostatic pressure within the bore, that is to say a static pressure differential between the bore and an outside of the tool body. Accordingly, the sleeve may be moved by pressurising the bore.

In some embodiments, the first hydraulic reservoir may communicate with the bore and the second hydraulic reservoir may communicate with an outside of the body (for example via a bleed port or ports through the body). In use, the bore can be pressurised to create a pressure differential between the bore and the outside of the body, so as to displace the sleeve assembly towards the second position (when the control valve is open).

The tool may further comprise a first tertiary hydraulic reservoir and/or a second tertiary hydraulic reservoir defined, at least in part, between the sleeve assembly and the body above and below the first and second hydraulic reservoirs, respectively.

The first tertiary hydraulic reservoir may communicate with the bore. The second tertiary hydraulic reservoir may communicate with an outside of the body. Provision of tertiary hydraulic reservoirs separate the first and second hydraulic reservoirs from fluid in the bore or well and may prevent debris or chemical treatments from entering the first and second hydraulic reservoirs, which might otherwise cause blockage or damage to the bleed conduit and control valve in certain downhole applications.

The first tertiary hydraulic reservoir may be at least partially open ended, at its upper end. The first tertiary hydraulic reservoir may communicate with the bore via one or more pressure ports through the sleeve assembly.

The first tertiary hydraulic reservoir may be separated from the first hydraulic reservoir by a first balance piston.

The first balance piston may be integrally formed with the adjacent part of the sleeve assembly, or may be fixed thereto. For example, the first balance piston may be form generally as a collar around the sleeve assembly, retrained by retaining screws, bolts or the like.

The first balance piston may be slidable with respect to the sleeve assembly and the body between a first upper end stop and a first lower end stop. Such slidable relationship may provide for a degree of damping.

The second tertiary hydraulic reservoir may be separated from the second hydraulic reservoir by a second balance piston. The second balance piston may be integrally formed with the adjacent part of the sieve assembly, or may be fixed thereto The second balance piston may be slidable with respect to the sleeve assembly and the body between a second upper end stop and a second lower end stop.

The sleeve assembly may be slidable under the action of a dynamic pressure differential. The sleeve assembly may be slidable under the action of a dynamic pressure differential along (i.e. longitudinally) the tool. The sleeve assembly may be slidable under the action of a dynamic pressure differential through a flow restriction within the bore defined by the sleeve assembly.

Flowing fluid through the bore creates a dynamic pressure differential sufficient to move the sleeve assembly.

At least a part of the length of the through bore may be defined by the sleeve assembly. At least a portion, and in some embodiments all, of the portion of the through bore defined by the sleeve assembly may have a diameter that is less than an upstream portion of the work string, whether that be an upstream portion of the tool, or a length of tubular upstream of the tool, etc.

Provision of each of: a flow restriction; communication of the first hydraulic reservoir (or first hydraulic tertiary reservoir as the case may be) with the bore; and communication of the second hydraulic reservoir (or second hydraulic tertiary reservoir as the case may be) with and outside of the body; provides for the sleeve assembly to be moved under the action of either a hydrostatic pressure in the bore or a dynamic pressure differential as disclosed herein.

The skilled person will understand that pumping of fluid may both increase the hydrostatic pressure in the tool and create a dynamic pressure drop. Provision of communication of the second hydraulic reservoir, or second tertiary hydraulic chamber with an outside of the tool may therefore better facilitate movement of the sleeve assembly, when fluid is pumped. For example, it may allow for a relatively minimal flow restriction in order to move the sleeve assembly by pumping or circulating fluid through the tool.

The control collar portion may be formed integrally with an adjacent portion of the body. The control collar portion may be attached to the body, for example by a lock key threaded through the body in to the control collar portion or by any other suitable means such as welding, grub screws or the line.

The first and second hydraulic reservoirs may be defined in part by upper and lower ends of the control collar portion, and adjacent surfaces of the sleeve assembly. The control collar portion may comprise first and second flange portions, extending radially outward, wherein an upper face of the first flange portion defines a lower end of the first hydraulic reservoir;

and wherein a lower face of the second flange portion defines an upper end of the second hydraulic reservoir.

The control collar portion, and in particular the first and second flange portions thereof may be provided with one or more seals for sealing against an inner surface of the body, for example one or more O-rings. The control collar may comprise one or more internal seals for slideably sealing between the control collar portion and the adjacent portion of the sleeve assembly, such as wiper seals.

The bleed conduit may extend generally longitudinally through one or more parts of the control collar portion. The first and second flange portions may comprise upper and lower end regions of the bleed conduit. An intermediate region of the bleed conduit may be defined by one or more hydraulic lines, optionally connected to the flange portions (by threaded compression fittings for example), or extending therethrough. The electromechanical valve may be connected to one or more said hydraulic lines.

The control collar portion may include one or more recesses, or more reduced diameter portions, between the upper and lower ends of the control collar portion. The control collar portion may comprise one or more recesses, or one or more reduced diameter portions, between the first and second flange portions.

Said recesses or reduced diameter portions provided space for additional apparatus to be housed. At least an intermediate region of the bleed conduit may be located in a said recess or reduced diameter portion. In some embodiments, the electromechanical control valve is located in a said recess or reduced diameter portion. In some embodiments a control system may be located in a said recess of reduced diameter portion.

As discussed above the electromechanical control valve may be powered by and controlled via wireline from the surface.

In some embodiments, however, the electromechanical control valve is battery powered. The tool may accordingly comprise a battery pack. The control collar portion may comprise the battery pack. The battery pack may be located in a said recess or reduced diameter portion of the control collar portion.

Where present, the control system and one or more sensors me communicate with and be powered from the battery pack.

Movement of the sleeve assembly between the first and second positions may change the tool between a deactivated and an activated condition.

The tool may comprise one more circulation ports. Movement of the sleeve assembly between the first and second positions may open and close the one or more circulation ports (i.e. changes the ports between deactivated (closed) and activated (open)).

The sleeve assembly may comprise one or more sleeve ports communicating with the through bore through the sleeve assembly to an outside of the sleeve assembly. The body may comprise one or more circulation ports extending radially through the body to an outside of the body.

In one of the first and second positions of the sleeve assembly, the one or more sleeve ports and the one or more circulation ports may be longitudinally misaligned, such that the tool is in a deactivated condition in which fluid in the through bore does not communicate with outside of the body.

In the other of the first and second positions of the sleeve assembly, the one or more sleeve ports and the one or more circulation ports may be longitudinally aligned, with each other or with an intermediate chamber defined between the sleeve assembly and the body, such that the tool is in an activated condition in which fluid in the through bore communicates with fluid outside of the body. In the activated condition fluid can be pumped through the work string and circulated via the one more sleeve ports and the one or more circulation ports to an outside of the tool.

The sleeve assembly may be operatively connected to an actuator, such as a linear actuator or a hydroelectic piston actuator, so as to change the condition of further apparatus between a deactivated and an activated condition. The sleeve assembly may be directly operatively coupled to further apparatus to change the condition of the further apparatus between a deactivated and an activated condition.

The further apparatus may include any downhole apparatus, including but not limited to an expandable stabilizer, an expandable packer, deployable cleaning, milling or scraping apparatus, deployable arms of an underreaming apparatus, a deployable anchor, whipstock or other wellbore departure tool. The range of further down whole apparatus and available means of operatively connecting to a sliding sleeve will be well known to one skilled in the art.

In some embodiments, the tool can be used as a casing cleaner or scraper, with sliding sleeve-deployable cleaning elements generally as described in PCT/EP2015/056540 or PCT/EP2019/053345, which are incorporated herein by reference. In some embodiments movement of the sleeve assembly from the first to the second position releases outwardly spring biased cleaning elements from a deactivated condition in which they lie recessed within the body to an activated position in which the cleaning elements extend radially from the body and can be used to clean or scrape a casing. The cleaning elements may, in the first position of the sleeve assembly, be latched to the sleeve assembly in the deactivated position and movement of the sleeve assembly to the second position releases the latch, as disclosed in co-pending application PCT/EP2019/053345.

The tool may comprise said one or more circulation ports and sleeve ports and the sleeve may be operatively coupled to additional downhole apparatus. For example the tool may comprise both deployable cleaning elements and selectively openable circulation ports as disclosed herein.

The tool may comprise more than one further downhole apparatus.

Movement of the sleeve assembly between the first and second positions may change the condition of more than one downhole apparatus, or may change the condition of one or more further downhole apparatus and circulation ports between their respective deactivated and activated conditions.

The condition of the respective circulation ports and/or further downhole apparatus may change generally simultaneously as the sleeve assembly moves between the first and second positions.

In some embodiments, the sleeve assembly is operable to move between the first and second positions and one or more defined third positions. The sleeve assembly may be operable to move between the first position, the second position and a defined third position that is intermediate the first and second positions. Where the tool comprises more than one deactivated condition and more than one corresponding activated condition, changing between a deactivating addition and an activated condition may be achieved in some embodiments by moving the sleeve assembly between the third position and one of the first and second positions. The tool may for example be configured to activate a downhole apparatus, such as deployable cleaning elements, on the movement of the sleeve assembly between the first and third positions, and to open circulation ports or activate a further downhole apparatus, on movement of the sleeve assembly between the third and second positions.

In some embodiments the one or more third positions may be defined by closing the electromechanical control valve and hydraulically locking the sleeve assembly in a defined third position. The tool may comprise a sensor such as an optical sensor or a mechanical switch to detect when the sleeve assembly is at the third position and cause the electromechanical control valve to close.

The tool may be configured to cause the electromechanical control valve to automatically close under certain circumstances. For example, the electromechanical control valve may be configured to close after a predetermined amount of time has elapsed since the electromechanical control valve has been opened.

Alternatively, or in addition, be configured to automatically close when the sleeve assembly arrives at the first and/or second position.

The tool may be equipped with one or more sensors for detecting the position of the sleeve assembly. In some embodiments an accelerometer or acoustic sensor used to detect control signals may also be configured to detect the position of the sleeve assembly, for example when the sleeve assembly contacts an end stop and creates a vibration or sound.

The control system may be configured to effect such automatic closing of the electromechanical control valve.

The sleeve assembly may be of unitary construction (with any ancillary apparatus, such as seals or the like).

The sleeve assembly may comprise a single sleeve, to which is optionally mounted the balance pistons.

The sleeve assembly may comprise multiple sleeves connected end to end; for example threadably connected to one another.

The body may be of unitary construction (i.e. formed as a single piece, optionally with the exception of the control collar portion and, where present, any downhole apparatus which may be mounted or coupled to the body). The body may be a generally tubular mandrel. The body may comprise multiple body portions connected to one another end to end.

The body may include connectors for connecting the tool to the work string above and below the tool. Any suitable connectors may be used such as threaded pin connectors, as known to one skilled in the art.

According to a second aspect of the invention there is provided a method of moving a sliding sleeve assembly of a downhole tool between a first position and a second position, wherein a first hydraulic reservoir is defined between the sleeve assembly and a body of the tool above a first end of a control collar portion of the body, and a second hydraulic reservoir is defined between the sleeve assembly and the body below a second end of the control collar portion; wherein the control collar portion comprises a bleed conduit extending generally longitudinally between the first and second hydraulic reservoirs;

the method comprising:

generating a hydrostatic pressure differential between the through bore and an outside of the tool; and/or generating a dynamic pressure differential in the through bore across the tool or across a flow restriction defined by the sleeve assembly;

opening a control valve (such as an electromechanical control valve);

flowing hydraulic fluid between the first and second hydraulic reservoirs generally longitudinally along the bleed conduit via the control valve; and closing the control valve to hydraulically lock the sleeve assembly in the first or second position.

The steps may be conducted in any suitable order. For example the pressure differential may be created before, or after the control valve is opened.

The method may comprise issuing a control signal or signals to open and/or close the control valve. That method may comprise issuing a control signal or signals to one or more sensors in communication with the electromechanical control valve. The method may comprise creating a downhole condition in order to issue a control signal to a said sensor.

The downhole condition may for example comprise pressurising the bore pumping fluid through the bore, moving the tool longitudinally and/or rotationally, e.g. by stroking the work string or rotating the work string as disclosed herein in relation to the first aspect.

For example the tool may comprise an accelerometer in communication with the electromechanical control valve and the method may comprise issuing a rotational signal to the accelerometer by rotating the tool.

In some embodiments, the electromechanical control valve, or a control system communicating therewith, is configured to respond to one or more sequences of rotational signals (or other downhole conditions or wireline signals), such as a predetermined sequence of rotations and/or counter rotations separated by non-rotating periods.

The method may comprise controlling the electromechanical control valve via a wireline connection. the method may comprise controlling the control valve via more than one of the said downhole conditions or wireline.

The sleeve assembly may be resiliently biased towards one of the first or the second position. Accordingly, the method may comprise moving the sleeve assembly from the first to the second position under the action either the hydraulic pressure differential or a resilient biasing member; and moving the sleeve assembly from the second to the first position under the action of the other of the hydraulic pressure differential or resilient biasing member.

Where the method includes multiple steps of moving the sleeve assembly between the first and second positions camera will be understood that the method may comprise additional steps of opening and or closing the control valve.

The pressure differential may be a hydrostatic pressure differential between the bore and an outside of the tool. The method may comprise generating the hydrostatic pressure differential by generating a hydrostatic pressure within the bore.

The method may accordingly comprise flowing fluid between the second hydraulic reservoir (or, in some embodiments, a second tertiary hydraulic reservoir as disclosed herein) and an outside of the tool (e.g. via a bleed port).

The pressure differential may be a dynamic pressure differential. The method may comprise generating a dynamic pressure differential across the tool or through a flow restriction defined by the sleeve assembly.

The tool may comprise one more circulation ports. Movement of the sleeve assembly between the first and second positions may open and close the one or more circulation ports.

The method may comprise opening and or closing one or more circulation ports by moving the sleeve assembly between the first and second positions. The method may for example comprise aligning and misaligning one or more sleeve ports extending from the bore through the sleeve assembly with one or more circulation ports extending through the body to an outside of tool, by moving the sleeve assembly between the first and second positions. The method may comprise aligning and mis aligning the sleeve ports with an intermediate chamber in communication with the circulation ports, by moving the sleeve assembly between the first and second positions.

The sleeve assembly may be operatively coupled to one or more further downhole apparatus. The method may comprise changing the condition of one or more further downhole apparatus between a deactivated and an activated condition, by moving the sleeve assembly between the first and second positions, as disclosed herein in relation to the first aspect.

The method may comprise attaching the tool to a work string. The method may comprise running the work string into a well.

The method may comprise the use of the downhole tool of the first aspect of the invention.

Optional features of each aspect of the invention correspond to optional features of any other aspect of the invention. In particular the method of the second aspect of the invention may comprise the use of any features described in relation to the tool of the first aspect of the invention; and the tool of the first aspect of the invention may comprise any features or apparatus required to carry out the method of the second aspect of the invention.

The term "longitudinally" refers to an orientation generally along the work string, and thus generally along a length of the tool, between the upper and lower ends thereof. It will be understood that the tool is of generally cylindrical configuration and thus may be considered to have a longitudinal axis extending along the tool. The term "radially" refers to an orientation perpendicular to the longitudinal orientation, for example radially in relation to the longitudinal axis. Whilst the tool may have a longitudinal axis, it will need not be entirely symmetrical around the longitudinal axis, and downhole apparatus, components of the control collar portion etc. may be distributed non symmetrically around the longitudinal axis.

Reference herein to an "end" (e.g. a first end or a second end) of a feature of the tool, such as the body, sleeve assembly, control collar portion, etc. relate to the longitudinal dimension. Thus a first end of a given feature is necessarily longitudinally spaced apart from the second end.

Terms such as "above" and "below" are used in relation to the longitudinal orientation of work string or tool. Where a feature that is above another feature is positioned along the work string (or tool) closer to the surface and a feature that is below another feature is positioned along the work string (or tool) further from the surface-regardless of the orientation of the well or borehole in relation to vertical.

DESCRIPTION OF THE DRAWINGS

Non-limiting example embodiments will now be described with relation to the following drawings in which.

DETAILED DESCRIPTION OF EXAMPLE EMBODIMENT

Figure 1A:
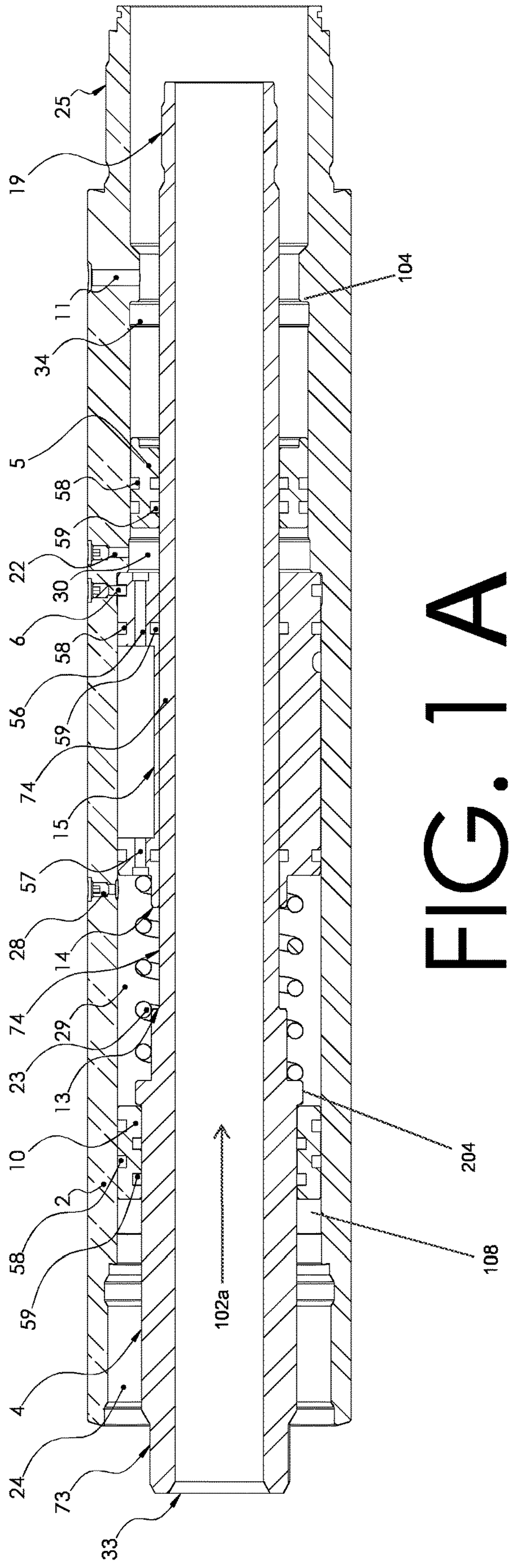
FIG. 1A shows a cross sectional side view longitudinally through of an upper part of an embodiment of a downhole tool with a sleeve assembly in a first position.

With reference to FIGS. 1A, 1B and 2-4, the downhole tool includes a body 100 and a through bore 102, 102*a*. The body includes a control collar portion 15, which in the embodiment shown is formed as a separate unit (see FIG. 3) which is secured within the body 100 by a lock key 6, which engages with a recess 31 on the outer surface of the control collar 15.

A sleeve assembly 200 (shown in perspective view on FIG. 2), consists generally of an upper sleeve 4 threadably coupled to a lower sleeve 8, via respective outer threaded region 19 of the upper sleeve and inner threaded region 20 of the lower sleeve 8. The upper and lower sleeves 4, 8 are provided with hex formations 71, 74 to facilitate such coupling. In alternative embodiments the sleeve assembly may comprise a single sleeve, or a greater number of sleeves.

A portion 102*a* of the through bore 102 is defined by the sleeve assembly. The diameter of the bore 102*a* through the sleeve assembly is less than the diameter of the bore 102 above and below the sleeve assembly defined by the body 100.

The control collar portion 15 is disposed around a lower region 74 of the upper sleeve 4.

Figure 4:
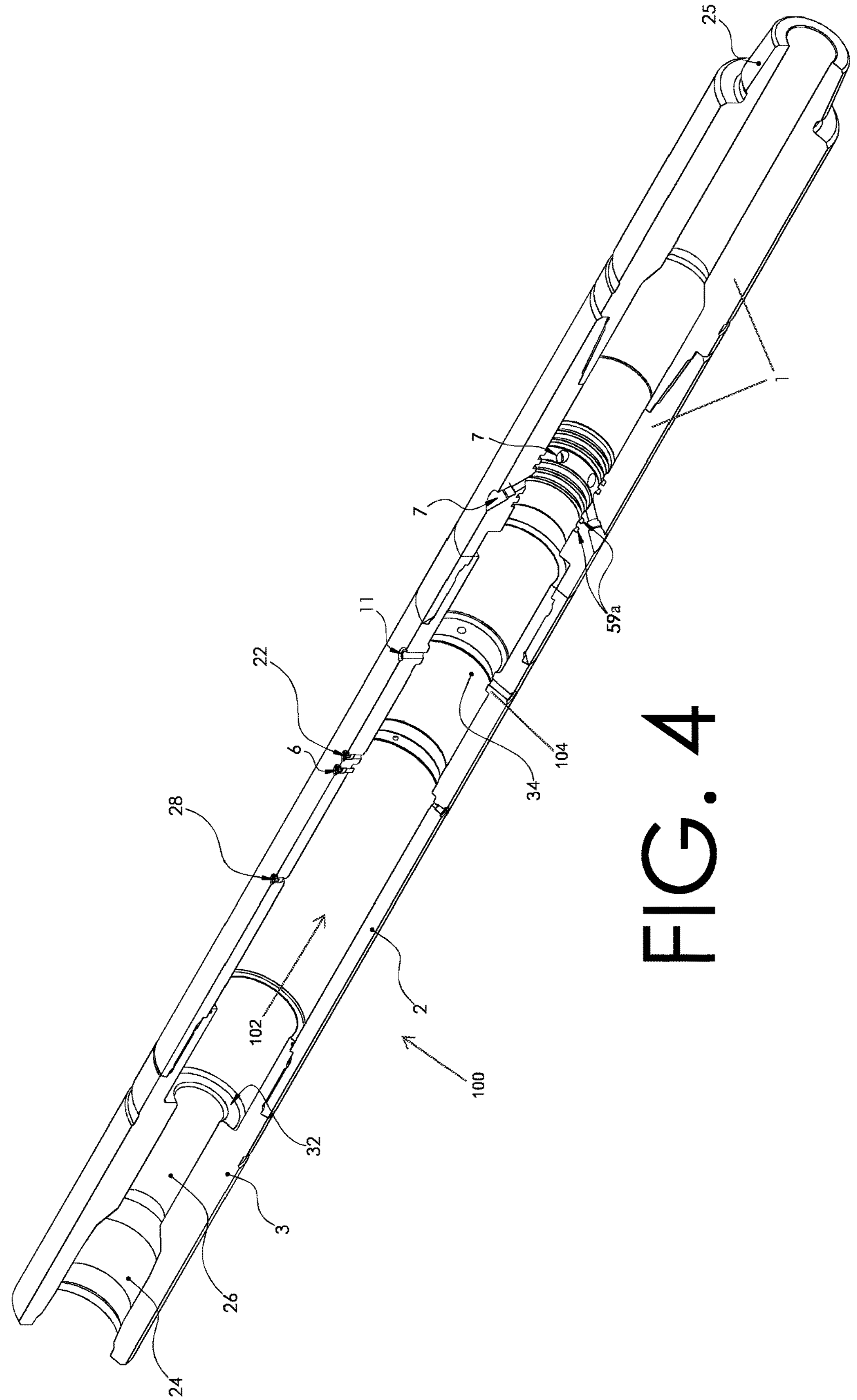
FIG. 4 shows a perspective cross sectional view of the body of the downhole tool.

As shown in FIG. 4, in the embodiment shown, the body 100 includes lower 1, middle 2, and upper 3 sections which are threadably coupled together via conventional male 25 and female 24 pin connectors. For clarity, the upper and lower body sections are omitted from FIGS. 1A and 1B.

A first hydraulic reservoir 29 is defined between the sleeve assembly 200 and the body 100 above the control collar portion 15 (to the left in FIGS. 1A and B). A second hydraulic reservoir 30 is defined between the sleeve assembly 200 and the body 100 below the control collar portion 15 (to the right in FIGS. 1A and B).

In the embodiment shown, the first and second hydraulic reservoirs 29, 30 are defined by The upper and lower ends 60, 61 of the control collar portion, adjacent outer surfaces of the upper sleeve 4 and inner surfaces of the body 100. The first and second hydraulic reservoirs are also in part defined by ends of first and second balance pistons, the function of which will be discussed in further detail below The sleeve assembly 200 is slidable within the body 100 between a first position, shown in FIG. 1A and a second position, shown in FIG. 1B. In the first position, the upper end 33 of the upper sleeve 4 abuts the lower end 32 of upper body section 3, which functions as an end stop.

In the second position, a stop shoulder 13 around the upper sleeve 4 encounters an opposing stop shoulder 14 extending from the upper end of the control collar 15.

The sleeve assembly 200 is spring biased towards the first position shown in FIG. 1A, by a coiled spring 23. The spring is disposed in the first hydraulic reservoir 29 and acts between the upper face 60 of the control collar 15 and a shoulder 204 around the upper sleeve 4.

The tool also includes a first balance piston 10 and a second balance piston 5. The balance pistons 5, 10 are, in the embodiment shown, slideable in relation to the sleeve assembly 200 and body 100 and accordingly include inner and outer seals 58, 59. It will be understood that the balance cylinders are optional and are omitted in alternative embodiments, and in still further embodiments are fixed in relation to the sleeve assembly.

A lower end of the first balance cylinder 10 defines the upper end of the first hydraulic reservoir 29. An upper end of the first balance cylinder 10 defines a lower end of a first tertiary hydraulic reservoir 108, between the body and the sleeve 4. The first tertiary hydraulic reservoir communicates with the bore 100 at its upper end, via an annulus defined between the upper sleeve 4 and the upper body section 3.

The first balance cylinder 10 is slideable along the sleeve 4 between the shoulder 204 and the lower end of the upper body section 3.

An upper end of the second balance cylinder 5 defines the lower end of the second hydraulic reservoir 30. A lower end of the second balance cylinder 5 defines an upper end of a second tertiary hydraulic reservoir 34. The second tertiary hydraulic reservoir communicates with an outside of the body via bleed ports 11 through the middle body section 2. The lower end of the secondary tertiary hydraulic reservoir 34 is defined by the wiper seal 74.

The second balance cylinder is slideable along the lower part 74 of the sleeve 4 between an inner shoulder 104 of the middle body section 2, and the lower end face 61 of the control collar 15.

The body 100 includes fill ports 28, 22 by which the first and second hydraulic reservoirs are filled with hydraulic fluid. The ports are then plugged. The first tertiary hydraulic reservoir 108 is filled with fluid in the bore 100 and the second tertiary hydraulic reservoir 34 is filled with fluid from the wellbore. The balance pistons 5, 10 isolate the first and second hydraulic reservoirs 29, 30 from ingress of unwanted fluids or debris.

In alternative embodiments (not shown) the hydraulic reservoirs 29, 30 themselves communicate with the bore and outside of the tool respectively. Further embodiments include entirely sealed hydraulic reservoirs.

Figure 3:
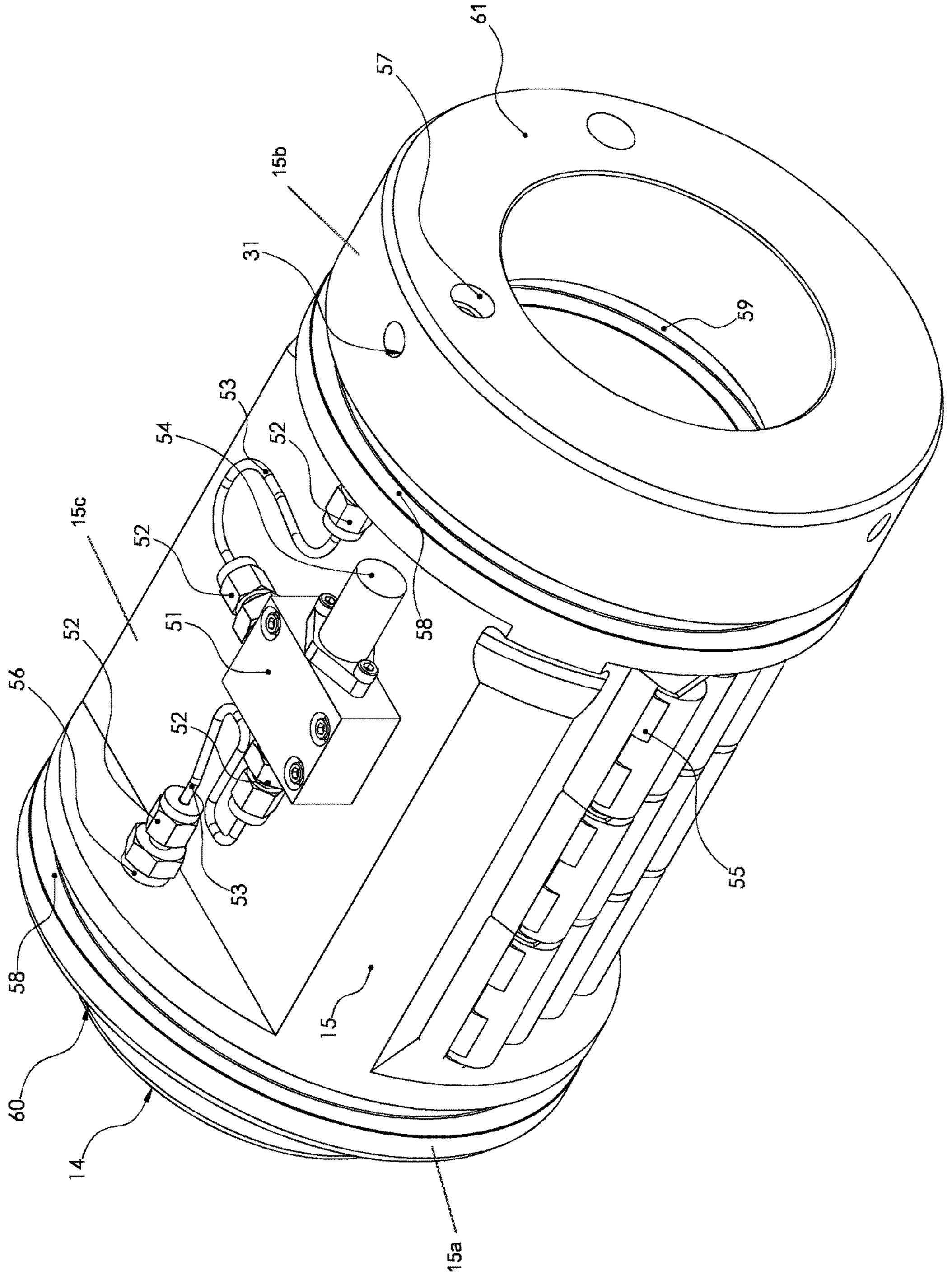
FIG. 3 shows a perspective of the control collar portion of the downhole tool.

FIG. 3 shows the control collar 15 in further detail.

The control collar portion 15 further comprises a bleed conduit that extends between the first and the second hydraulic reservoirs 29, 30. The bleed conduit is defined in part by apertures extending through the control collar 15 and in part by hydraulic lines.

The collar has upper and lower flange portions 15*a*, 15*b* at the first and second ends of the collar 15. The flange portions 15*a*, 15*b* define the respective first and second ends 60, 61 of the collar 15. An upper channel 56 extends through the upper flange portion, and extends from the upper end face 60, exiting at a recess 15*c* between the flange portions 15*a*, 15*b*. Similarly, a lower channel 57 extends through the lower flange portion 15*b*, extending from the lower end face 61 and exiting to the recess 15*c*. The upper and lower channels thus communicate with the first and second hydraulic reservoirs 29, 30. Hydraulic lines 53 positioned within the recess 15*c* are connected by threaded compression couplings 52 to the upper and lower channels 56, 57. The hydraulic lines 53 each also connect to a solenoid valve 51, having a solenoid 54.

End regions of the bleed conduit are thus defined by the upper and lower channels 56, 57 and an intermediate region of the bleed conduit is defined by the hydraulic lines 53, with the solenoid valve 51 being positioned in the bleed conduit.

The first and second hydraulic reservoirs 29, 30 each have a minimum and maximum radius and the entire length of the bleed conduit is within the maximum and minimum radii of the reservoirs.

The solenoid (i.e. electromechanical) valve 51 includes an accelerometer (not shown) and a control system (not shown), by which control over the valve 51 can be effected by way of rotational signals received by the accelerometer, as disclosed herein.

The control collar 15 also includes a battery pack 55 which communicates with and powers the valve 51. The battery pack is housed within an adjacent recess between the upper and lower flange portions of the collar 15.

The control collar has a central bore sized to slideably receive the sleeve assembly 200 (and the lower part 74 of the upper sleeve in particular. The flange portions 15*a*, 15*b* are sized to be received within the body 100. Seals 58 are provided around the flange portions to seal between the collar 15 and the body 100. Seals 59 are also provided to slideably seal between the control collar 15 and the sleeve assembly 200.

Movement of the sleeve assembly between the first and second positions will now be described with reference to FIGS. 1A and 1B.

In use, the tool will be connected to a work string and run into a well.

The electromechanical control valve is opened by rotating the tool (from the surface, via the work string) to transmit rotational control signals to the accelerometer.

Fluid is pumped through the work string.

The section 26 of the bore 102 that is defined by the upper body section 3 above the upper end 33 of the sleeve assembly 200 is of wider diameter than the bore 102*b* through the sleeve assembly. Fluid flow through the bore 102 to the narrower section 102*a* defined by the sleeve assembly 200 creates a dynamic pressure differential. Hydrostatic pressure in the bore 102, 102*a* also increases, resulting in a static pressure differential between the bore and the wellbore outside of the body. When either the static pressure differential, the dynamic pressure differential or their combined effects overcomes the resistance of the spring 23, the sleeve moves towards the second position.

With the control valve 51 open, hydraulic fluid is able to flow generally longitudinally from the second hydraulic reservoir 30, along the bleed conduit 57, 53, 56 and to the first hydraulic reservoir.

It should be noted that if the valve 51 is closed, such fluid pumping through the work string (as might be required for other downhole operations, e.g. in relation to other equipment run in on the work string) would not cause movement of the sleeve, since fluid would not be able to flow between the first and second hydraulic reservoirs and the sleeve would be hydraulically locked.

If, as is typically the case, the balance cylinders are at their upper end stops, or between their upper and lower end stops, fluid is also displaced into the first tertiary hydraulic reservoir 108 and out of the second tertiary hydraulic reservoir 34. One or other of the exchange of fluid between the first and second hydraulic reservoirs and the flow into and out of the first and second tertiary hydraulic reservoirs may be rate limiting (typically the bore may be pumped/pressurised such that flow through the bleed conduit is rate-limiting), such that the movement of the floating balance cylinders 10, 5 independent of the sleeve 4 provides for a degree of damping.

Figure 1B:
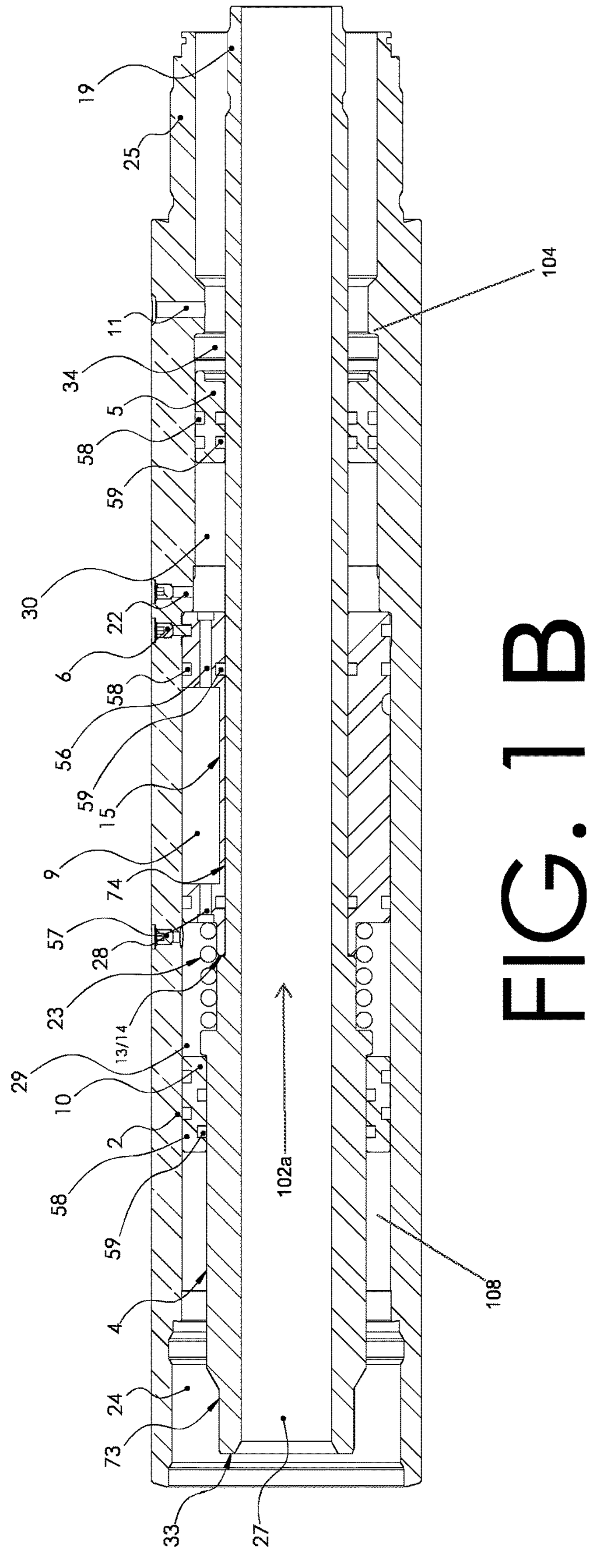
FIG. 1B shows a cross sectional view of an upper part of an embodiment of a downhole tool with a sleeve assembly in a second position.

When the sleeve assembly 200 reaches the second position shown in FIG. 1B (and the balance cylinders 5, 10 are at their lower end stops), the solenoid control valve 51 is closed. This prevents flow of fluid along the bleed conduit and hydraulically locks the sleeve assembly in the second position. With the valve closed, subsequent pressure changes in the bore 100 or the wellbore outside of the tool, which act upon the balance cylinders 5, 10 cannot cause further movement of the sleeve assembly.

Closure of the control valve can occur automatically, after a predetermined time sufficient for the sleeve to have moved has elapsed since opening. Alternatively, or in addition, further rotational signals can be transmitted to the accelerometer to close the control valve 51. The accelerometer (or optionally further sensors or trip switches) may also be configured to detect landing of the sleeve at the second position. The control valve's control system may be configured to effect closure of the valve under any or all of these circumstances.

When the control valve 51 is again opened (by rotation of the tool), and pumping/circulation of fluid in the bore 100 has ceased, the spring 23 urges the sleeve back towards the first position shown in FIG. 1A and fluid flows from the second hydraulic reservoir 30 back into the first hydraulic reservoir 29 along the bleed conduit 56, 53, 57.

Fluid is also drawn into the second tertiary hydraulic reservoir 34 via the bleed port 11. Where cessation of pumping causes a negative pressure differential between the outside of the tool and the bore 100, the floating balance pistons 5, 10 can move independently in relation to the sleeve 4 towards their upper end stops, thereby damping motion of the sleeve.

In use, as discussed above, the total volume of the first and second reservoirs 29, 30 is constant and volume increases of the first tertiary hydraulic reservoir 108 correspond to volume decreases of the second tertiary hydraulic reservoir 34.

Movement of the sleeve between the first and second positions changes the condition of the tool from a deactivated condition to an activated condition. The embodiment shown is a fluid circulation tool.

Figure 2:
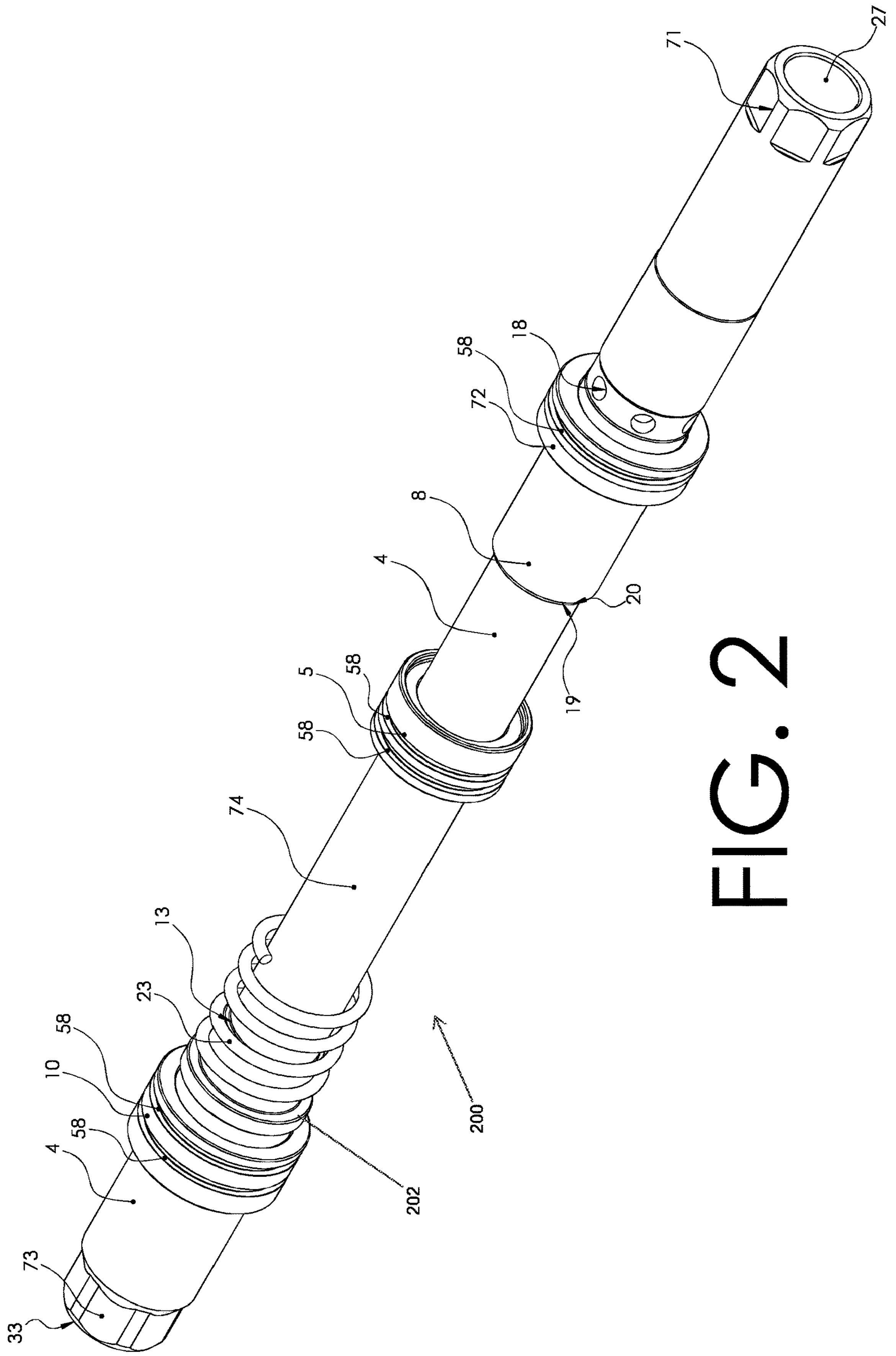
FIG. 2 shows a perspective view of a sleeve assembly of the downhole tool, with the control collar portion omitted for clarity.

With reference to FIGS. 2 and 4, the sleeve assembly 200 includes an array of sleeve ports 18 which extend through the lower sleeve 8 to the bore 102*a*. The sleeve ports 18 are separated from the second tertiary hydraulic reservoir 34 by a wiper seal 72 provided with external seals 58 against the body (to which it is fixed, generally as described above in relation to the control collar) and internal deals (not shown) around the lower sleeve 8.

The lower body section 1 is provided with an array of upwardly oriented circulation ports 7. To either side thereof are positioned internal seals 59, which seal around the sleeve 8.

When the sleeve is in the first position, the sleeve ports 18 are misaligned with and above the circulation ports 7, and separated therefrom by the internal seals 59*a*. The seals 59*a* isolate the bore 102*a* from the ports 7 and thus the outside of the tool. The circulation tool is in a deactivated condition, when the sleeve is in the first position.

When the sleeve assembly is in the second position, the sleeve ports 18 are moved into alignment with the circulation ports 7 such that the bore 102*a* communicates with the outside of the tool via the ports 7, 18 and the circulation tool is in an activated condition.

In alternative embodiments, the circulation tool can be arranged to be in a deactivated condition when the tool is in the second position.

In alternative embodiments, the sleeve can be operatively be coupled to additional downhole apparatus, such as cutters or scraper elements that are caused to move outwardly upon movement of the sleeve. For example, an outer surface of the sleeve or an inner face of one or more cleaning elements may be ramped.

Stabiliser elements may similarly be operatively coupled to a sleeve. In still further embodiments, reamer arms or indeed various further down hole apparatus as known in the art may be connected to the body caused to activate by movement of the sleeve.

Whilst exemplary embodiments have been described herein, these should not be construed as limiting to the modifications and variations possible within the scope of the invention as disclosed herein and recited in the appended claims.

The invention claimed is:

1. A downhole tool, comprising:
- a body having a through bore;
- a sleeve assembly slideable within the body between a first position and a second position, under the action of hydraulic pressure and/or a biasing arrangement;
- and the body comprising a control collar portion disposed around the sleeve assembly;
- wherein a first hydraulic reservoir is defined between the sleeve assembly and the body above a first end of the control collar portion and the body, and a second hydraulic reservoir is defined between the sleeve assembly and the body below a second end of the control collar portion and the body;
- wherein the control collar portion further comprises;
- a bleed conduit extending generally longitudinally between the first and second hydraulic reservoirs; and
- an electromechanical control valve across the bleed conduit configured to regulate fluid flow along the bleed conduit.

2. The tool of claim 1, wherein the first hydraulic reservoir is defined between a first end of the control collar portion and the body and/or wherein the second hydraulic reservoir is defined between a second end of the control collar portion and the body.

3. The tool of claim 1, comprising one or more sensors and/or a wireline in communication with the electromechanical control valve, wherein the electromechanical control valve is operable to open and/or close on detection of a pre-determined control signal or signals by said sensor or sensors or received via the wireline.

4. The tool of claim 3, comprising an accelerometer, wherein the electromechanical control valve is controllable by moving the tool longitudinally and/or rotationally.

5. The tool of claim 1, wherein the sleeve assembly is resiliently biased towards one or other of the first and second positions, by a resilient biasing member acting between the sleeve assembly and the body.

6. The tool of claim 1, further comprising a first tertiary hydraulic reservoir and/or a second tertiary hydraulic reservoir defined, at least in part, between the sleeve assembly and the body above and below the first and second hydraulic reservoirs, respectively.

7. The tool of claim 1, wherein the sleeve assembly is slidable under the action of a hydrostatic pressure differential between the bore an outside of the tool body.

8. The tool of claim 7, wherein the first hydraulic reservoir communicates with the bore and the second hydraulic reservoir communicates with an outside of the body via one or more bleed ports through the body.

9. The tool of claim 6, wherein the sleeve assembly is slidable under the action of a hydrostatic pressure differential between the bore an outside of the tool body; and the second tertiary hydraulic reservoir communicates with an outside of the body.

10. The tool of claim 6, wherein the sleeve assembly is resiliently biased towards one or other of the first and second positions, by a resilient biasing member acting between the sleeve assembly and the body, and wherein the first tertiary hydraulic reservoir is separated from the first hydraulic reservoir by a first balance piston and/or the second tertiary hydraulic reservoir is separated from the second hydraulic reservoir by a second balance piston.

11. The tool of claim 1, wherein the sleeve assembly is slidable between the first and second positions under the action of a dynamic pressure differential along the tool or through a flow restriction within the bore defined by the sleeve assembly.

12. The tool of claim 1, wherein movement of the sleeve assembly between the first and second positions may change the tool between a deactivated and an activated condition.

13. The tool of claim 12, comprising one more circulation ports, wherein movement of the sleeve assembly between the first and second positions opens and closes the one or more circulation ports.

14. The tool of claim 12, wherein the sleeve assembly is operatively coupled to further downhole apparatus to change the condition of the further apparatus between a deactivated and an activated condition, when the sleeve assembly moves between the first and second conditions.

15. The tool of claim 1, wherein the sleeve assembly is operable to move between the first and second positions and one or more defined third positions, wherein the one or more third positions are optionally defined by closing the electromechanical control valve and hydraulically locking the sleeve assembly in said defined third position.

16. A method of moving a sliding sleeve assembly of a downhole tool between a first position and a second position, wherein a first hydraulic reservoir is defined between the sleeve assembly and a body of the tool above a first end of a control collar portion of the body, and a second hydraulic reservoir is defined between the sleeve assembly and the body below a second end of the control collar portion; wherein the control collar portion comprises a bleed conduit;

the method, comprising the steps of:

generating a dynamic pressure differential along the tool or through a flow restriction within the bore defined by the sleeve assembly, and/or generating a hydrostatic pressure differential between the through bore and an outside of the tool;

opening a control valve;

flowing hydraulic fluid between the first and second hydraulic reservoirs generally longitudinally along the bleed conduit via the control valve; and closing the control valve to hydraulically lock the sleeve assembly in the first or second position.

17. The method of claim 16, comprising issuing a control signal or signals to open and/or close the control valve.

18. The method of claim 17, wherein tool comprises an accelerometer in communication with the electromechanical control valve and the method comprises issuing a rotational signal to the accelerometer by rotating the tool.

19. The method of claim 16, further comprising generating the hydrostatic pressure differential by generating a hydrostatic pressure between the bore and an outside of the tool.

20. The method of claim 16, wherein the sleeve assembly is operatively coupled to one or more further downhole apparatus, and the method comprises changing the condition of one or more further downhole apparatus between a deactivated and an activated condition, by moving the sleeve assembly between the first and second positions.

21. The method of claim 16, wherein the step of opening a control valve opens an electromechanical control valve.

* * * * *